(12) United States Patent
Kiyosumi

(10) Patent No.: US 10,234,788 B2
(45) Date of Patent: Mar. 19, 2019

(54) ELECTRONIC DEVICE TO WHICH DETACHABLE MEMBER IS ATTACHED, IMAGE FORMING APPARATUS

(71) Applicant: KYOCERA Document Solutions Inc., Osaka-shi, Osaka (JP)

(72) Inventor: Tadahiro Kiyosumi, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 15/852,405

(22) Filed: Dec. 22, 2017

(65) Prior Publication Data

US 2018/0181025 A1    Jun. 28, 2018

(30) Foreign Application Priority Data

Dec. 28, 2016    (JP) ................................ 2016-256000

(51) Int. Cl.
*G03G 15/08* (2006.01)
*H04N 1/00* (2006.01)
(Continued)

(52) U.S. Cl.
CPC ..... *G03G 15/0856* (2013.01); *G03G 15/0863* (2013.01); *G03G 21/1652* (2013.01); *H04N 1/00254* (2013.01); *G03G 15/0868* (2013.01); *G03G 15/0875* (2013.01); *G03G 15/80* (2013.01); *G03G 21/1685* (2013.01); *G03G 2215/0888* (2013.01);
(Continued)

(58) Field of Classification Search
CPC ........... G03G 15/0808; G03G 15/0831; G03G 15/0865; G03G 15/533; G03G 15/556
See application file for complete search history.

(56) References Cited

U.S. PATENT DOCUMENTS 5,600,355 A * 2/1997 Wada ........................ B41J 2/415
347/115
2007/0009281 A1* 1/2007 Sato ........................ G03B 21/18
399/90

(Continued)

FOREIGN PATENT DOCUMENTS

JP        02227975 A    9/1990

*Primary Examiner* — Walter L Lindsay, Jr.
*Assistant Examiner* — Jessica L Eley
(74) *Attorney, Agent, or Firm* — Alleman Hall Creasman & Tuttle LLP

(57) ABSTRACT

An electronic device includes a first electrode, a second electrode, a third electrode, a first resistor, a second resistor, and an attachment/detachment detecting portion. The first electrode and the second electrode are separated from each other upon an attachment of a detachable member. The third electrode comes into contact with the first electrode upon the attachment of the detachable member. The first resistor is arranged on a conduction path that extends from a power supply to the first electrode. The second resistor is arranged on either a first conduction path or a second conduction path, the first conduction path extending from the second electrode to a ground, the second conduction path extending from the third electrode to the ground. The attachment/ detachment detecting portion detects attachment state of the detachable member based on a voltage applied to the first electrode.

8 Claims, 6 Drawing Sheets

(51) Int. Cl.
*G03G 21/16* (2006.01)
*G03G 15/00* (2006.01)

(52) U.S. Cl.
CPC .......... *G03G 2221/1639* (2013.01); *G03G 2221/1651* (2013.01); *G03G 2221/1672* (2013.01)

(56) References Cited

U.S. PATENT DOCUMENTS

2007/0092270 A1* 4/2007 Inukai .................... G03G 15/80
399/13
2009/0116864 A1* 5/2009 Ino ..................... G03G 15/0898
399/92

* cited by examiner

ELECTRONIC DEVICE TO WHICH DETACHABLE MEMBER IS ATTACHED, IMAGE FORMING APPARATUS

INCORPORATION BY REFERENCE

This application is based upon and claims the benefit of priority from the corresponding Japanese Patent Application No. 2016-256000 filed on Dec. 28, 2016, the entire contents of which are incorporated herein by reference.

BACKGROUND

The present disclosure relates to an electronic device to which a detachable member is attached, and to an image forming apparatus.

A detachable member such as a toner container is attached to an electronic device such as a printer. For example, an electronic device of this type detects attachment state of the detachable member by using a switch that alternates between a conductive state and a non-conductive state depending on whether or not the detachable member is attached to a device main body. In addition, there is known a related technology for removing an oxide film that has been formed on a contact of the switch, by flowing a larger current than normal through the switch when the switch is in the conductive state.

SUMMARY

An electronic device according to an aspect of the present disclosure includes a first electrode, a second electrode, a third electrode, a first resistor, a second resistor, and an attachment/detachment detecting portion. The first electrode and the second electrode are separated from each other upon an attachment of a detachable member. The third electrode comes into contact with the first electrode upon the attachment of the detachable member. The first resistor is arranged on a conduction path that extends from a power supply to the first electrode. The second resistor is arranged on either a first conduction path or a second conduction path, the first conduction path extending from the second electrode to a ground, the second conduction path extending from the third electrode to the ground. The attachment/detachment detecting portion detects attachment state of the detachable member based on a voltage applied to the first electrode.

An image forming apparatus according to another aspect of the present disclosure includes an electronic device and an image forming portion. The electronic device includes a first electrode and a second electrode, a third electrode, a first resistor, a second resistor, an attachment/detachment detecting portion, an insertion portion, a fourth electrode, a fifth electrode, and a detachable member. The detachable member is a developer storage portion storing developer. The first electrode and the second electrode are separated from each other upon an attachment of the detachable member. The fourth electrode is provided in contact with a surface of the second electrode that is in contact with the first electrode, and is separated from the second electrode upon the attachment of the detachable member. The insertion portion is provided on the detachable member, and is inserted between the first electrode and the second electrode and between the fourth electrode and the second electrode so that the first electrode and the fourth electrode are separated from the second electrode. The third electrode is provided on the insertion portion, and comes into contact with the first electrode at a contact point between the first electrode and the second electrode. The first resistor is arranged on a conduction path that extends from a power supply to the first electrode. The second resistor is provided on the insertion portion, and is arranged on a second conduction path extending from the third electrode to the ground. The fifth electrode is provided on the insertion portion in a state of being connected with the third electrode via the second resistor, and comes into contact with the fourth electrode upon the attachment of the detachable member. The attachment/detachment detecting portion detects attachment state of the detachable member based on a voltage applied to the first electrode. The image forming portion forms an image by using the developer.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes embodiments of the present disclosure with reference to the accompanying drawings for the understanding of the present disclosure. It should be noted that the following embodiments are examples of specific embodiments of the present disclosure and should not limit the technical scope of the present disclosure.

First Embodiment

Figure 1:
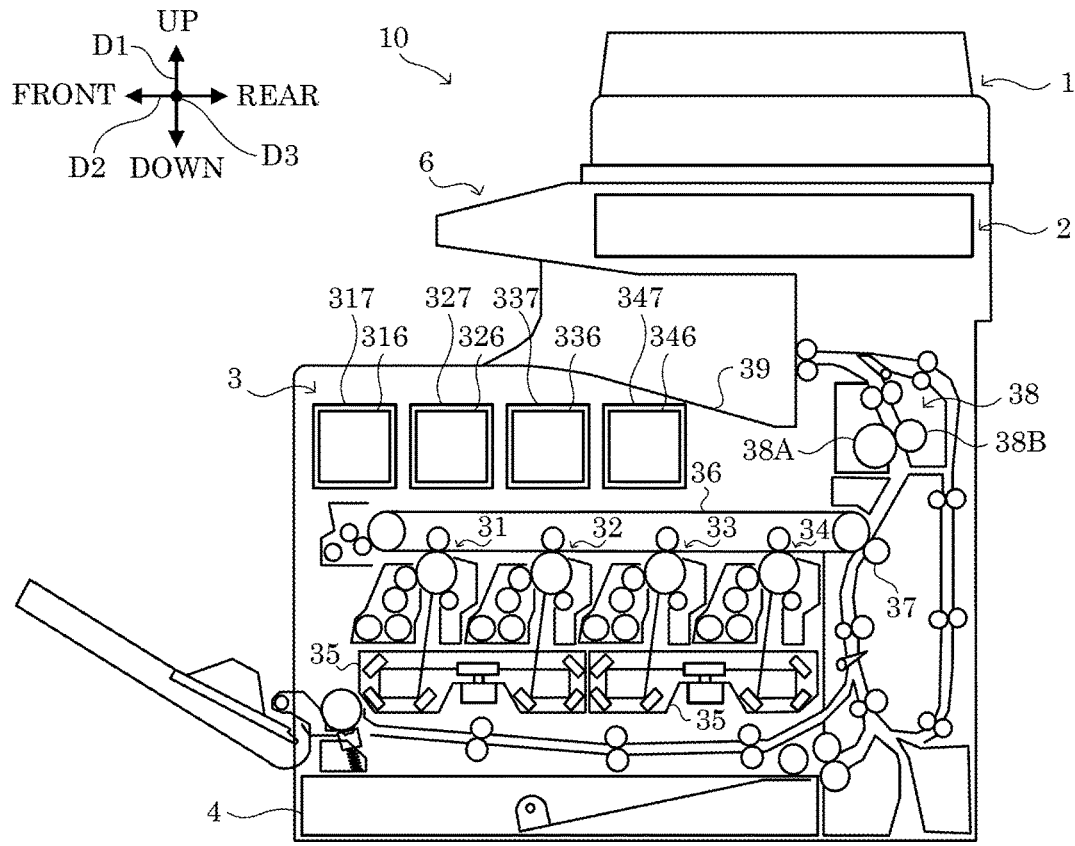
FIG. 1 is a diagram showing a configuration of an image forming apparatus according to a first embodiment of the present disclosure.
Figure 2:
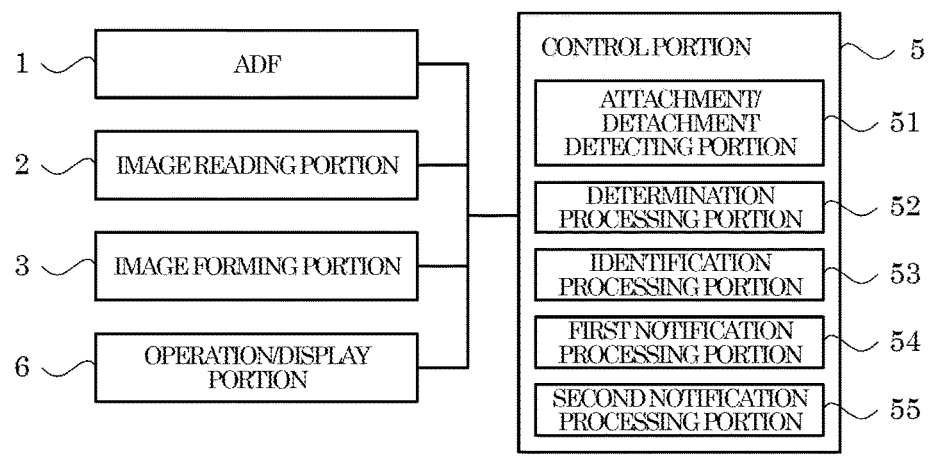
FIG. 2 is a block diagram showing a system configuration of the image forming apparatus according to the first embodiment of the present disclosure.

The following describes a configuration of an image forming apparatus 10 according to a first embodiment of the present disclosure with reference to FIG. 1 and FIG. 2. FIG. 1 is a schematic cross-sectional diagram showing a configuration of the image forming apparatus 10.

It is noted that for the sake of explanation, a vertical direction in a state where the image forming apparatus 10 is installed in a usable manner (the state shown in FIG. 1) is defined as an up-down direction D1. In addition, a front-rear direction D2 is defined on the supposition that a surface of the image forming apparatus 10 on the left side in FIG. 1 is the front surface. In addition, a left-right direction D3 is defined based on the front surface of the image forming apparatus 10 in the installed state.

The image forming apparatus 10 is a multifunction peripheral having a plurality of functions such as: a print function for forming an image based on image data; a scan function; a facsimile function; and a copy function. Here, the image forming apparatus 10 is an example of the electronic device of the present invention. It is noted that the present disclosure is applicable to electronic devices such as a printer device, a facsimile device, a copier, an air conditioner, and a vacuum cleaner.

As shown in FIG. 1 and FIG. 2, the image forming apparatus 10 includes an ADF 1, an image reading portion 2, an image forming portion 3, a sheet feed portion 4, a control portion 5, and an operation/display portion 6.

The ADF 1 includes a document sheet setting portion, a plurality of conveyance rollers, a document sheet pressing, and a sheet discharge portion, and conveys a document sheet so that it is read by the image reading portion 2. The image reading portion 2 includes a document sheet table, a light source, a plurality of mirrors, an optical lens, and a CCD, and is configured to read image data from a document sheet.

The sheet feed portion 4 includes a sheet feed cassette, a sheet conveyance path, and a plurality of conveyance rollers, and supplies sheets one by one to the image forming portion 3. For example, the sheets supplied to the image forming portion 3 are sheet-like materials such as sheets of paper, sheets of coated paper, postcards, envelopes, and OHP sheets.

The control portion 5 includes control equipment such as CPU, ROM, RAM, and EEPROM that are not shown. The CPU is a processor that executes various calculation processes. The ROM is a nonvolatile storage device in which various information such as control programs for causing the CPU to execute various processes are stored in advance. The RAM is a volatile storage device, and the EEPROM is a nonvolatile storage device. The RAM and the EEPROM are used as temporary storage memory (working area) for the various processes executed by the CPU. In the control portion 5, the CPU executes the various control programs stored in advance in the ROM. This allows the image forming apparatus 10 to be controlled comprehensively by the control portion 5. It is noted that the control portion 5 may be constituted from an electronic circuit such as an integrated circuit (ASIC), and may be a control portion provided independently of a main control portion that comprehensively controls the image forming apparatus 10.

The operation/display portion 6 includes a display portion and an operation portion. The display portion is, for example, a liquid crystal display and displays various types of information based on control instructions from the control portion 5. The operation portion is composed of, for example, operation keys or a touch panel through which various types of information are input to the control portion 5 based on user operations.

[Configuration of Image Forming Portion 3]

Figure 3:
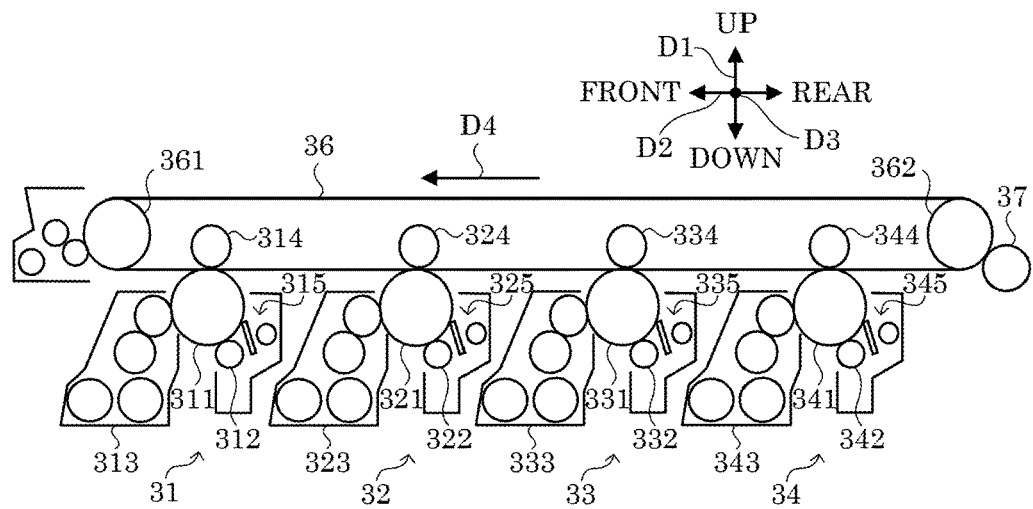
FIG. 3 is a diagram showing a configuration of image forming units and an intermediate transfer belt of the image forming apparatus according to the first embodiment of the present disclosure.
Figure 4:
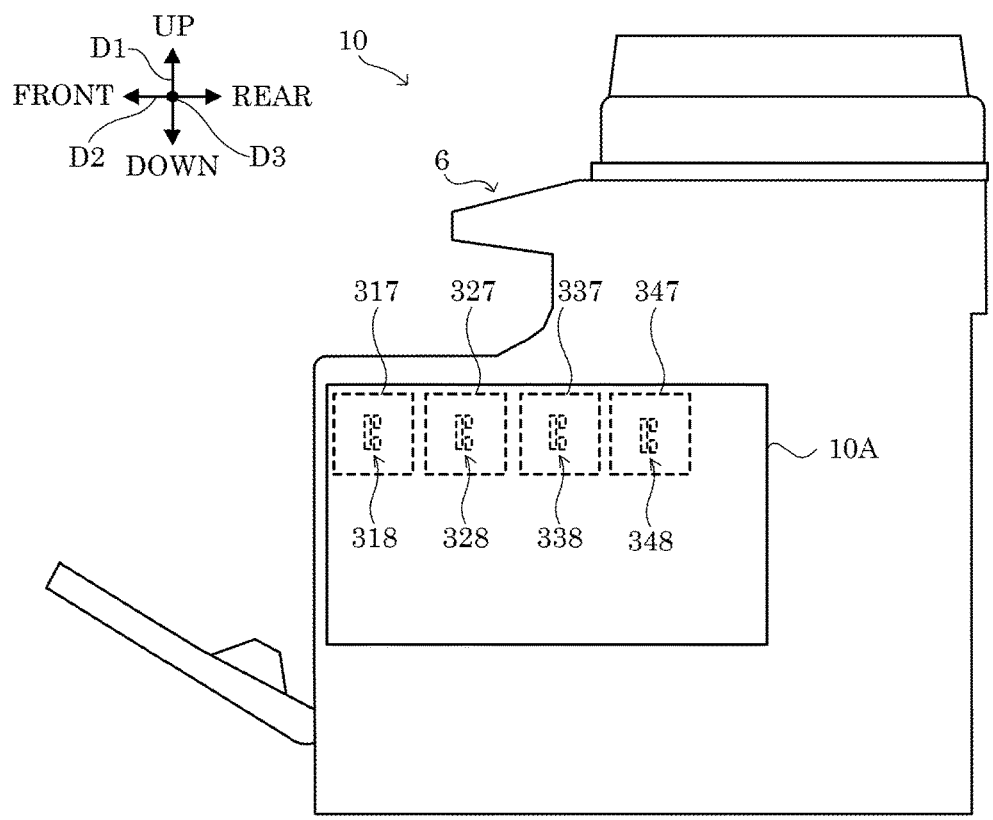
FIG. 4 is a diagram showing a configuration of attachment portions of the image forming apparatus according to the first embodiment of the present disclosure.

Next, a configuration of the image forming portion 3 is described with reference to FIG. 1 to FIG. 4. Here, FIG. 3 is a schematic cross-sectional diagram showing a configuration of image forming units 31 to 34 and an intermediate transfer belt 36. In addition, FIG. 4 is a schematic diagram showing a configuration of the right side surface of the image forming apparatus 10.

The image forming portion 3 is configured to execute an image formation process (a print process) in which to form a color or monochrome image by the electrophotography system based on image data read by the image reading portion 2. In addition, the image forming portion 3 may execute the print process based on image data input from an external information processing apparatus such as a personal computer.

Specifically, as shown in FIG. 1 and FIG. 3, the image forming portion 3 includes a plurality of image forming units 31 to 34, a laser scanning device 35, an intermediate transfer belt 36, a secondary transfer roller 37, a fixing device 38, and a sheet discharge tray 39.

The image forming units 31, 32, 33, and 34 are electrophotographic image forming units corresponding to Y (yellow), C (cyan), M (magenta), and K (black), respectively. As shown in FIG. 1, the image forming units 31 to 34 are arranged in alignment along the front-rear direction D2 of the image forming apparatus 10, in an order of yellow, cyan, magenta, and black from the front side of the image forming apparatus 10.

As shown in FIG. 1 and FIG. 3, the image forming unit 31 includes a photoconductor drum 311, a charging roller 312, a developing device 313, a primary transfer roller 314, a drum cleaning portion 315, a toner container 316, and an attachment portion 317.

In addition, each of the image forming units 32 to 34 has the same configuration as the photoconductor drum 31. That is, as shown in FIG. 1 and FIG. 3, the image forming unit 32 includes a photoconductor drum 321, a charging roller 322, a developing device 323, a primary transfer roller 324, a drum cleaning portion 325, a toner container 326, and an attachment portion 327. In addition, the image forming unit 33 includes a photoconductor drum 331, a charging roller 332, a developing device 333, a primary transfer roller 334, a drum cleaning portion 335, a toner container 336, and an attachment portion 337. In addition, the image forming unit 34 includes a photoconductor drum 341, a charging roller 342, a developing device 343, a primary transfer roller 344, a drum cleaning portion 345, a toner container 346, and an attachment portion 347.

The laser scanning device 35 forms an electrostatic latent image on a surface of the photoconductor drum included in each of the image forming units 31 to 34. Specifically, the laser scanning device 35 irradiates light based on image data, on the surface of the photoconductor drum included in each of the image forming units 31 to 34.

The intermediate transfer belt 36 is an endless belt member onto which toner images are transferred from the surfaces of the photoconductor drums included in the image forming units 31 to 34. The intermediate transfer belt 36 is stretched between a first stretch roller 361 and a second stretch roller 362 (see FIG. 3) with a predetermined tension. The intermediate transfer belt 36 moves along the front-rear direction D2 of the image forming apparatus 10 as the first stretch roller 361 or the second stretch roller 362 is rotationally driven by a driving force supplied from a power supply (not shown).

The secondary transfer roller 37 transfers the toner images adhered to the surface of the intermediate transfer belt 36, to a sheet supplied from the sheet feed portion 4. A voltage is applied to the secondary transfer roller 37 from a power supply device (not shown). This allows an electric field to be formed between the secondary transfer roller 37 and the intermediate transfer belt 36, and the toner image adhered to the surface of the intermediate transfer belt 36 is transferred to the sheet.

The fixing device 38 fuses and fixes, to the sheet, the toner image transferred to the sheet by the secondary transfer roller 37. For example, the fixing device 38 includes a fixing roller 38A and a pressure roller 38B. The fixing roller 38A is provided in contact with the pressure roller 38B, and fixes the toner image transferred to the sheet, to the sheet by heating the toner image. The pressure roller 38B presses the sheet when the sheet passes through a nip portion formed between the pressure roller 38B and the fixing roller 38A.

The sheet to which the toner image was fixed by the fixing device 38 is discharged onto the sheet discharge tray 39.

In the image forming portion 3, a color image is formed on a sheet supplied from the sheet feed portion 4, in the following procedures, and the sheet after the image formation is discharged onto the sheet discharge tray 39.

First, in the image forming unit 31, the photoconductor drum 311 is uniformly charged to a predetermined potential by the charging roller 312. Next, the laser scanning device 35 irradiates light based on image data on the surface of the photoconductor drum 311. This allows an electrostatic latent image corresponding to the image data to be formed on the surface of the photoconductor drum 311. The electrostatic latent image on the photoconductor drum 311 is then developed (visualized) as a yellow toner image by the developing device 313. It is noted that yellow toner is replenished to the developing device 313 from the toner container 316.

Subsequently, the yellow toner image formed on the photoconductor drum 311 is transferred to the intermediate transfer belt 36 by the primary transfer roller 314. On the other hand, toner that has remained on the surface of the photoconductor drum 311 is removed by the drum cleaning portion 315. For example, in the drum cleaning portion 315, the toner that has remained on the surface of the photoconductor drum 311 is removed by a cleaning member. The toner removed by the cleaning member is conveyed to a toner collection container (not shown) by a conveyance screw, and collected therein.

In the image forming units 32 to 34, too, toner images of respective colors are formed on the photoconductor drums included in the image forming units 32 to 34 in the same processing procedures as in the image forming unit 31. The toner images are transferred to the intermediate transfer belt 36 as one toner image by being overlaid on the intermediate transfer belt 36 in an order of yellow, cyan, magenta, and black. The toner image transferred to the intermediate transfer belt 36 is transferred by the secondary transfer roller 37 to a sheet supplied from the sheet feed portion 4. Subsequently, the sheet with the toner image transferred thereto passes through the fixing device 38 in which the toner image on the sheet is fused and fixed to the sheet, and the sheet is discharged onto the sheet discharge tray 39.

Next, the toner container and the attachment portion provided in each of the image forming units 31 to 34 are described. It is noted that the toner containers respectively provided in the image forming units 31 to 34 have a common configuration except that they store toner of different colors. In addition, the attachment portions provided in the image forming units 31 to 34 have a common configuration except that they correspond to different colors of toner. As a result, in the following, only the toner container 316 and the attachment portion 317 provided in the image forming unit 31 are described, and description of the toner containers and the attachment portions provided in the image forming units 32 to 34 is omitted.

The toner container 316 stores yellow toner that is supplied to the developing device 313. For example, as shown in FIG. 1, the toner container 316 has an approximately quadratic prism shape that is elongated along the left-right direction D3.

The toner container 316 is attached to the attachment portion 317. That is, in the image forming apparatus 10, the attachment portion 317 corresponds to yellow among the colors of toner used in the image formation. For example, as shown in FIG. 1 and FIG. 4, the attachment portion 317 is a recessed portion of a square shape that is formed from the right side surface of the image forming apparatus 10 in a left direction D31 (see FIG. 5) of the left-right direction D3 and is configured to hold the toner container 316. As shown in FIG. 4, the attachment portion 317 is covered with a housing cover 10A. The housing cover 10A is an openable/closable cover member provided on the exterior of the image forming apparatus 10. When the toner container 316 is replaced, the housing cover 10A is opened and the attachment portion 317 is exposed to outside. The toner container 316 is inserted in the attachment portion 317 that is exposed to outside, in the left direction D31 so as to be attached to the attachment portion 317. Here, the toner container 316 is an example of the developer storage portion of the present disclosure, and is an example of the detachable member. In addition, toner stored in the toner container 316 is an example of the developer of the present disclosure.

It is noted that the detachable member of the present disclosure may be the toner collection container in which the toner removed from the photoconductor drum 311 by the drum cleaning portion 315 is stored. In addition, the detachable member of the present disclosure may be the sheet feed cassette of the sheet feed portion 4. In addition, the present disclosure is applicable to an image forming apparatus that forms an image by an inkjet system. In that case, the developer of the present disclosure may be ink that is used for the image formation.

Meanwhile, there is known a configuration for detecting attachment state of the toner container 316 by using a switch that alternates between a conductive state and a non-conductive state depending on whether or not the toner container 316 is attached to the attachment portion 317. In addition, there is known a related technology for removing an oxide film that has been formed on a contact of the switch, by flowing a larger current than normal through the switch when the switch is in the conductive state.

However, according to the related technology, when the switch is in the non-conductive state, the oxide film is not suppressed from being formed on the contact of the switch. As a result, when the switch is in the non-conductive state for a long time, the film thickness of the oxide film formed on the contact of the switch may become excessively thick. In that case, even when a larger current than normal is flowed through the switch after the switch becomes in the conductive state, the oxide film on the contact of the switch may not be removed. When the oxide film formed on the contact of the switch cannot be removed, a conduction failure may occur to the switch, and an attachment or a detachment of the toner container 316 to/from the attachment portion 317 may not be detected.

On the other hand, in the image forming apparatus 10 according to the first embodiment of the present disclosure, as described in the following, it is possible to suppress the formation of the oxide film on a member that is used to detect attachment state of the toner container 316.

Specifically, the image forming unit 31 includes a connection portion 318, an insertion portion 319, a first resistor R1, and a power supply PS. It is noted that each of the image forming units 32 to 34 includes components that correspond to the connection portion 318, the insertion portion 319, the first resistor R1, and the power supply PS.

Figure 5:
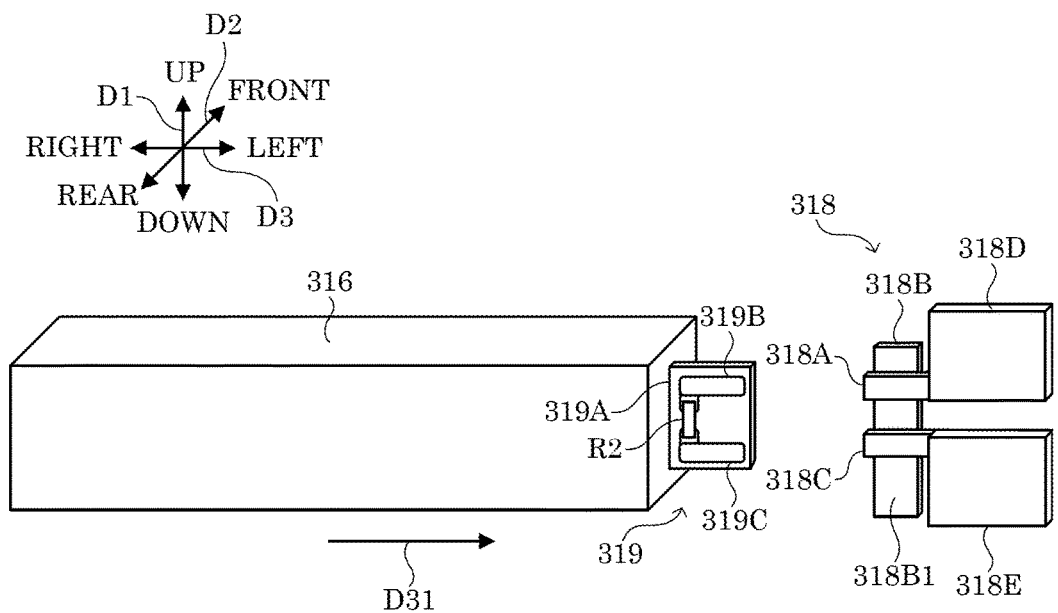
FIG. 5 is a diagram showing a configuration of a toner container and a connection portion of the image forming apparatus according to the first embodiment of the present disclosure.
Figure 6:
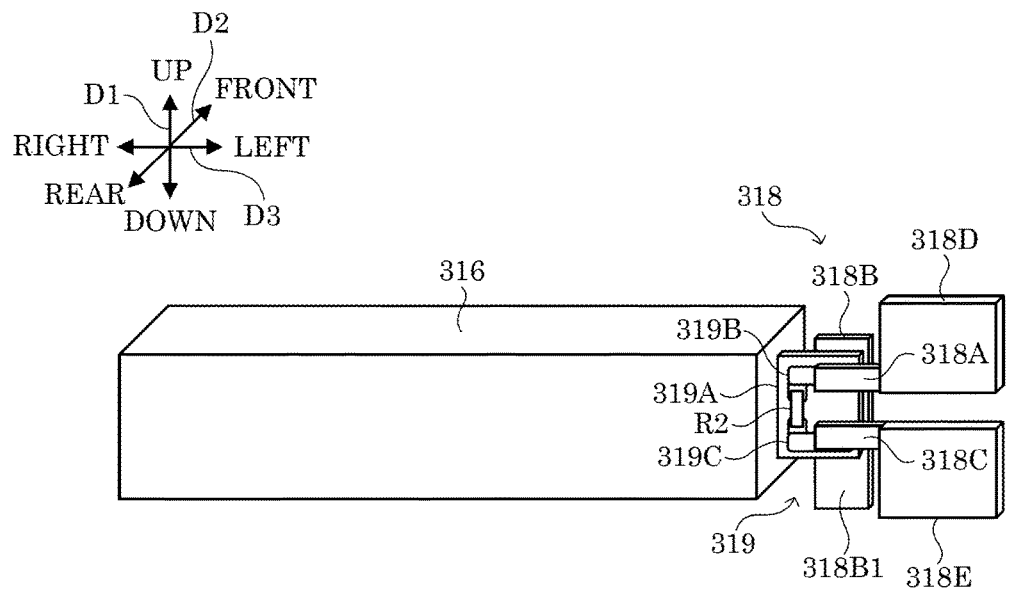
FIG. 6 is a diagram showing a configuration of the toner container and the connection portion of the image forming apparatus according to the first embodiment of the present disclosure.
Figure 7:
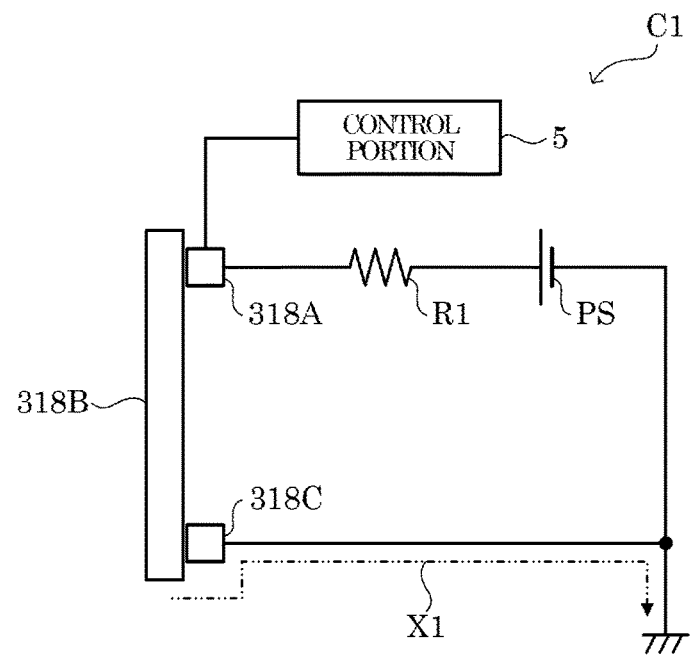
FIG. 7 is a diagram showing a configuration of a detection circuit of the image forming apparatus according to the first embodiment of the present disclosure.
Figure 8:
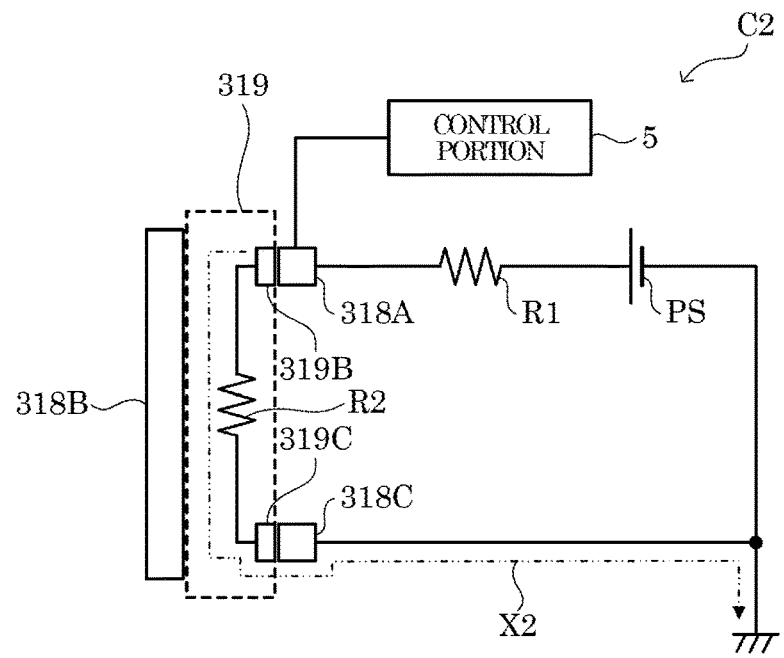
FIG. 8 is a diagram showing a configuration of another detection circuit of the image forming apparatus according to the first embodiment of the present disclosure.

The following describes the connection portion 318, the insertion portion 319, the first resistor R1, and the power supply PS with reference to FIG. 4 to FIG. 8. Here, FIG. 5 is a perspective diagram showing a state of the connection portion 318 and the insertion portion 319 before the toner container 316 is attached to the attachment portion 317. In addition, FIG. 6 is a perspective diagram showing a state of the connection portion 318 and the insertion portion 319 after the toner container 316 is attached to the attachment portion 317. In addition, FIG. 7 is a circuit diagram showing a detection circuit C1. In addition, FIG. 8 is a circuit diagram showing a detection circuit C2. It is noted that in FIG. 8, the insertion portion 319 is represented by a dotted line.

The connection portion 318 is used to detect attachment state of the toner container 316. As shown in FIG. 4, the connection portion 318 is provided in a left-end portion of the attachment portion 317 in the left-right direction D3. As shown in FIG. 5, the connection portion 318 includes a first electrode 318A, a second electrode 318B, and a fourth electrode 318C.

The first electrode 318A is an elastic member having conductivity. For example, as shown in FIG. 5, the first electrode 318A is a flat-plate-like metal member that is elongated in the left-right direction D3, and is thick in the front-rear direction D2. A left-end portion of a rear surface of the first electrode 318A is supported by a first support portion 318D. This enables a right-end portion of the first electrode 318A to be elastically deformed in the front-rear direction D2.

The second electrode 318B is conductive. For example, as shown in FIG. 5, the second electrode 318B is a flat-plate-like metal member that is elongated in the up-down direction D1, and is thick in the front-rear direction D2. The second electrode 318B is provided in a state where a contact surface 318B1 which is a rear surface thereof, is in contact with the first electrode 318A.

The first electrode 318A and the second electrode 318B are separated from each other when the toner container 316 is attached to the attachment portion 317. Specifically, when the toner container 316 is attached to the attachment portion 317, the insertion portion 319 that is described below is inserted between the first electrode 318A and the second electrode 318B so that the first electrode 318A and the second electrode 318B are separated from each other.

The fourth electrode 318C is an elastic member having conductivity. For example, as is the case with the first electrode 318A, the fourth electrode 318C is a flat-plate-like metal member that is elongated in the left-right direction D3, and is thick in the front-rear direction D2. In the connection portion 318, the first electrode 318A and the fourth electrode 318C are provided in parallel in the up-down direction D1. A left-end portion of a rear surface of the fourth electrode 318C is supported by a second support portion 318E. Similar to the first electrode 318A, this enables a right-end portion of the fourth electrode 318C to be elastically deformed in the front-rear direction D2. In addition, the fourth electrode 318C is provided in a state where a right end portion thereof is in contact with the contact surface 318B1 of the second electrode 318B. As is the case with the first electrode 318A, the fourth electrode 318C is separated from the second electrode 318B when the toner container 316 is attached to the attachment portion 317.

As shown in FIG. 7, the power supply PS is electrically connected with the first electrode 318A of the connection portion 318. The first resistor R1 is arranged on a conduction path that extends from the power supply PS to the first electrode 318A. The fourth electrode 318C is connected to the ground. With this configuration, as shown in FIG. 7, the detection circuit C1 that is composed of the power supply PS, the first resistor R1, the first electrode 318A, the second electrode 318B, and the fourth electrode 318C is formed in the image forming unit 31. The detection circuit C1 outputs, to the control portion 5, a voltage that is to be applied to the first electrode 318A. It is noted here that in the detection circuit C1, no resistor is arranged on a conduction path X1 (an example of the first conduction path of the present disclosure) that extends from the second electrode 318B that is in contact with the first electrode 318A, to the ground. As a result, the detection circuit C1 outputs a voltage of 0 volt to the control portion 5. It is noted that a resistor that differs in resistance value from a second resistor R2 that is described below, may be arranged on the conduction path X1.

The insertion portion 319, when the toner container 316 is attached to the attachment portion 317, is inserted between the first electrode 318A and the second electrode 318B and between the fourth electrode 318C and the second electrode 318B so that the first electrode 318A and the fourth electrode 318C are separated from the second electrode 318B. As shown in FIG. 5, the insertion portion 319 is provided to project from the left-end portion of the toner container 316 in the left direction D31. The insertion portion 319 includes a base body portion 319A, a third electrode 319B, a second resistor R2, and a fifth electrode 319C.

The base body portion 319A, when the toner container 316 is attached to the attachment portion 317, is inserted between the first electrode 318A and the second electrode 318B and between the fourth electrode 318C and the second electrode 318B of the connection portion 318. For example, the base body portion 319A is a flat-plate-like member that is thick in the front-rear direction D2. When the base body portion 319A is inserted between the first electrode 318A and the second electrode 318B and between the fourth electrode 318C and the second electrode 318B, the first electrode 318A and the fourth electrode 318C are elastically deformed rearward. After the base body portion 319A is pulled out from between the first electrode 318A and the second electrode 318B and between the fourth electrode 318C and the second electrode 318B, the first electrode 318A and the fourth electrode 318C are restored to the original forms, and come into contact with the contact surface 318B1 of the second electrode 318B.

The third electrode 319B is provided on a surface of the base body portion 319A that comes into contact with the first electrode 318A and the fourth electrode 318C. The third electrode 319B is a conductive member. For example, the third electrode 319B is a metal member.

The second resistor R2 is provided on the surface of the base body portion 319A that comes into contact with the first electrode 318A and the fourth electrode 318C. The second resistor R2 is electrically connected with the third electrode 319B and the fifth electrode 319C.

The fifth electrode 319C is provided on the surface of the base body portion 319A that comes into contact with the first electrode 318A and the fourth electrode 318C. The fifth electrode 319C is a conductive member. For example, the fifth electrode 319C is a metal member. The fifth electrode 319C is electrically connected with the third electrode 319B via the second resistor R2.

When the toner container 316 is attached to the attachment portion 317, the third electrode 319B comes into contact with the first electrode 318A of the connection portion 318. Specifically, the third electrode 319B comes into contact with the first electrode 318A at a contact point between the first electrode 318A and the second electrode 318B.

In addition, when the toner container 316 is attached to the attachment portion 317, the fifth electrode 319C comes into contact with the fourth electrode 318C of the connection portion 318. Specifically, the fifth electrode 319C comes into contact with the fourth electrode 318C at a contact point between the fourth electrode 318C and the second electrode 318B.

With this configuration, as shown in FIG. 8, a detection circuit C2 that is composed of the power supply PS, the first resistor R1, the first electrode 318A, the third electrode 319B, the second resistor R2, the fifth electrode 319C, and the fourth electrode 318C is formed in the image forming unit 31. The detection circuit C2 outputs, to the control portion 5, a voltage that is to be applied to the first electrode 318A. It is noted here that in the detection circuit C2, the second resistor R2 is arranged on a conduction path X2 (an example of the second conduction path of the present disclosure) that extends from the third electrode 319B that is in contact with the first electrode 318A, to the ground. As a result, the detection circuit C2 outputs a voltage of the power supply PS that has been divided by the first resistor R1 and the second resistor R2, to the control portion 5.

It is noted that the insertion portion 319 may not be provided in the toner container 316. For example, the image forming unit 31 may include a movement mechanism that is configured to move the insertion portion 319 in the left-right direction D3 when the toner container 316 is attached to or detached from the attachment portion 317.

As another example, the insertion portion 319 and the second electrode 318B may be provided in parallel along the up-down direction D1 in the image forming unit 31, and the image forming unit 31 may include a movement mechanism that is configured to move both the insertion portion 319 and the second electrode 318B in the up-down direction D1 when the toner container 316 is attached to or detached from the attachment portion 317. That is, it may be configured that the first electrode 318A and the fourth electrode 318C are separated from the second electrode 318B by a mechanism that is different from the insertion portion 319.

As shown in FIG. 2, the control portion 5 includes an attachment/detachment detecting portion 51, a determination processing portion 52, an identification processing portion 53, a first notification processing portion 54, and a second notification processing portion 55. Specifically, the control portion 5 causes the CPU to execute the control programs stored in the ROM. This allows the control portion 5 to function as the attachment/detachment detecting portion 51, the determination processing portion 52, the identification processing portion 53, the first notification processing portion 54, and the second notification processing portion 55.

It is noted that in the following description, the toner container 316 is assumed to store any of yellow, cyan, magenta, and black toner. In addition, the second resistor R2 having a resistance value that corresponds to the color of toner stored in the toner container 316, is assumed to be provided in the toner container 316.

The attachment/detachment detecting portion 51 detects attachment state of the toner container 316 based on a voltage applied to the first electrode 318A.

For example, the attachment/detachment detecting portion 51 detects an attachment of the toner container 316 to the attachment portion 317 when a voltage input from the detection circuit C1 or the detection circuit C2 changes from lower than a predetermined threshold to equal to or higher than the threshold. On the other hand, the attachment/detachment detecting portion 51 detects a detachment of the toner container 316 from the attachment portion 317 when a voltage input from the detection circuit C1 or the detection circuit C2 changes from equal to or higher than the threshold to lower than the threshold. For example, the threshold is set to a voltage that is higher than a voltage output from the detection circuit C1 and lower than a voltage output from the detection circuit C2.

In the image forming apparatus 10, the operations of the components are controlled based on the result of detection by the attachment/detachment detecting portion 51. For example, in the image forming apparatus 10, when the attachment/detachment detecting portion 51 detects a detachment of the toner container 316 from the attachment portion 317, execution of the print process is prohibited until the attachment/detachment detecting portion 51 detects an attachment of the toner container 316 to the attachment portion 317. In addition, in the image forming apparatus 10, when the attachment/detachment detecting portion 51 detects a detachment of the toner container 316 from the attachment portion 317, a message indicating a detachment of the toner container 316 is displayed on the operation/display portion 6.

In addition, in the image forming apparatus 10, when the attachment/detachment detecting portion 51 detects an attachment of the toner container 316 to the attachment portion 317, the following process is executed.

When the attachment/detachment detecting portion 51 detects an attachment of the toner container 316 to the attachment portion 317, the determination processing portion 52 determines whether or not the attached toner container 316 is a toner container 316 of a predetermined specific type based on the voltage applied to the first electrode 318A. For example, a toner container 316 of the specific type is a toner container that was manufactured by one or more predetermined manufacturing principals.

For example, the determination processing portion 52 determines that the toner container 316 attached to the attachment portion 317, is a toner container 316 of the specific type when the voltage input from the detection circuit C2 is in a predetermined range from a lower-limit value to an upper-limit value, wherein the lower-limit value is higher than the threshold, and the upper-limit value is higher than the lower-limit value. On the other hand, the determination processing portion 52 determines that the attached toner container 316 is not a toner container 316 of the specific type when the voltage input from the detection circuit C2 is outside of the predetermined range.

When the attachment/detachment detecting portion 51 detects an attachment of the toner container 316 to the attachment portion 317, the identification processing portion 53 identifies a color of the toner stored in the toner container 316 based on the voltage applied to the first electrode 318A.

For example, the identification processing portion 53 identifies the color of the toner stored in the toner container 316 as yellow when the voltage input from the detection circuit C2 is lower than a predetermined first reference value that is set within the predetermined range. In addition, the identification processing portion 53 identifies the color of the toner as cyan when the voltage input from the detection circuit C2 is equal to or higher than the first reference value and lower than a second reference value that is set within the predetermined range and is higher than the first reference value. In addition, the identification processing portion 53 identifies the color of the toner as magenta when the voltage input from the detection circuit C2 is equal to or higher than the second reference value and lower than a third reference value that is set within the predetermined range and is higher than the second reference value. In addition, the identification processing portion 53 identifies the color of the toner as black when the voltage input from the detection circuit C2 is equal to or higher than the third reference value.

When the determination processing portion 52 determines that the attached toner container 316 is not a toner container 316 of the specific type, the first notification processing portion 54 notifies that.

For example, the first notification processing portion 54 displays on the operation/display portion 6 a message to the effect that the toner container 316 attached to the control portion 17 is not a toner container 316 of the specific type. This enables the user to recognize that the toner container 316 attached to the control portion 17 is not a toner container 316 of the specific type, and urges the user to replace the attached toner container 316.

When the color of the toner identified by the identification processing portion 53 is different from a color of toner that has been correlated in advance with the attachment portion 317 to which the toner container 316 is attached, the second notification processing portion 55 notifies that.

For example, when the color of the toner identified by the identification processing portion 53 is not yellow that has been correlated in advance with the attachment portion 317, the second notification processing portion 55 displays, on the operation/display portion 6, a message to the effect that the toner container 316 attached to the attachment portion 317 stores toner of a color that is different from the color correlated in advance with the attachment portion 317. This allows the user to recognize that the toner container 316 attached to the attachment portion 317 stores toner of a color that is different from the color corresponding to the attachment portion 317, and urge the user to replace the attached toner container 316.

It is noted that the control portion 5 may not include a part or all of the determination processing portion 52, the identification processing portion 53, the first notification processing portion 54, and the second notification processing portion 55.

As described above, in the image forming apparatus 10 according to the first embodiment, the first electrode 318A and the second electrode 318B are in contact with each other in a state where the toner container 316 is not attached to the attachment portion 317. In addition, in the image forming apparatus 10, when the toner container 316 is attached to the attachment portion 317, the third electrode 319B, in place of the second electrode 318B, comes into contact with the first electrode 318A. With this configuration, in the image forming apparatus 10, a current always flows through the first electrode 318A regardless of whether or not the toner container 316 is attached to the attachment portion 317, thereby suppressing the formation of the oxide film on the first electrode 318A. Accordingly, it is possible to suppress the formation of the oxide film on a member that is used to detect attachment state of the toner container 316.

In addition, in the image forming apparatus 10 according to the first embodiment, the third electrode 319B comes into contact with the first electrode 318A at a contact point between the first electrode 318A and the second electrode 318B. With this configuration, in the image forming apparatus 10, since a current always flows through the contact point between the first electrode 318A and the second electrode 318B which is also the contact point between the first electrode 318A and the third electrode 319B, it is possible to suppress the formation of the oxide film on the contact point more efficiently. It is noted that as another embodiment, the third electrode 319B may come into contact with the first electrode 318A at a position that is different from the contact point between the first electrode 318A and the second electrode 318B.

Furthermore, in the image forming apparatus 10 according to the first embodiment, the third electrode 319B is provided on the insertion portion 319 that separates the first electrode 318A from the second electrode 318B. As a result, compared to a configuration where the third electrode 319B is provided independently of the insertion portion 319, it is possible to simplify the configuration of the connection portion 318 and the insertion portion 319. It is noted that as another embodiment, the third electrode 319B may be provided independently of the insertion portion 319.

In addition, in the image forming apparatus 10 according to the first embodiment, compared to an image forming apparatus 10 according to a second embodiment that is described below, one electrode comes into contact with the first electrode 318A and the fourth electrode 318C. This simplifies the configuration of the connection portion 318.

Furthermore, in the image forming apparatus 10 according to the first embodiment, compared to an image forming apparatus 10 according to a third embodiment that is described below, the connection portion 318 includes the second electrode 318B, and the fourth electrode 318C comes into contact with the second electrode 318B at the contact surface 318B1 that is in contact with the first electrode 318A. This allows the third electrode 319B, the second resistor R2, and the fifth electrode 319C to be arranged on a same surface of the insertion portion 319. As a result, compared to the image forming apparatus 10 according to the third embodiment, it is possible to easily implement the third electrode 319B, the second resistor R2, and the fifth electrode 319C in the insertion portion 319.

Second Embodiment

Figure 9:
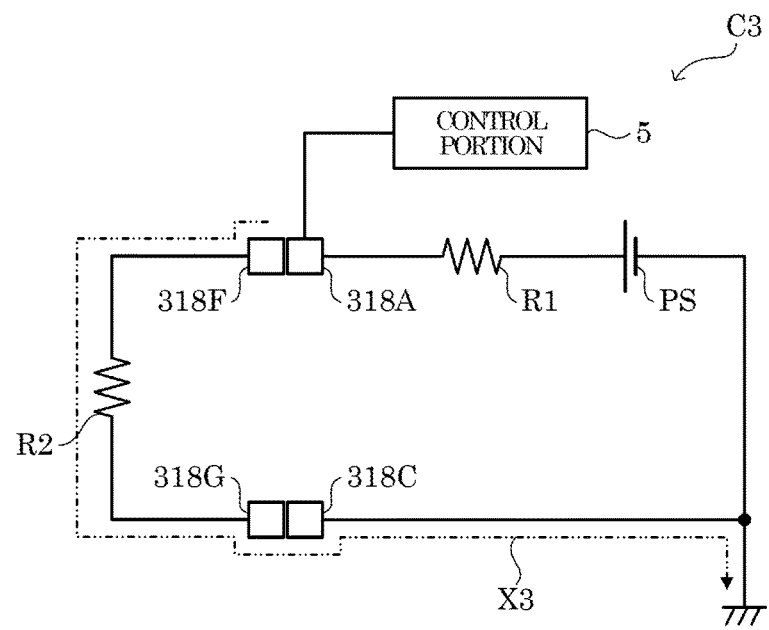
FIG. 9 is a diagram showing a configuration of a detection circuit of an image forming apparatus according to a second embodiment of the present disclosure.
Figure 10:
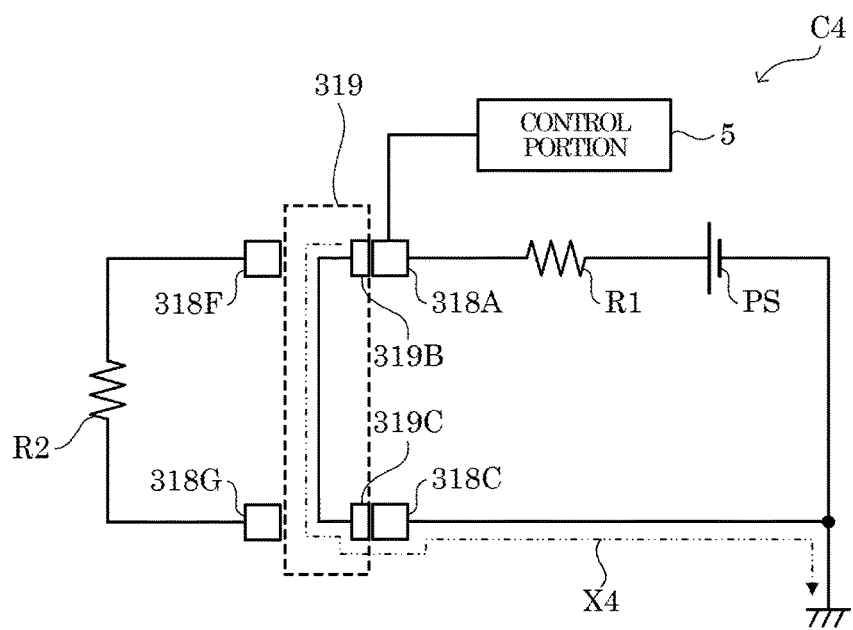
FIG. 10 is a diagram showing a configuration of another detection circuit of the image forming apparatus according to the second embodiment of the present disclosure.

The following describes the image forming apparatus 10 according to the second embodiment of the present disclosure with reference to FIG. 9 and FIG. 10. In the image forming apparatus 10 according to the second embodiment, configurations of the connection portion 318 and the insertion portion 319 are different from those in the first embodiment. The other configurations are common to the first embodiment and the second embodiment. It is noted that FIG. 9 is a circuit diagram showing a detection circuit C3. In addition, FIG. 10 is a circuit diagram showing a detection circuit C4.

Specifically, as shown in FIG. 9, the connection portion 318 of the image forming apparatus 10 according to the second embodiment includes a sixth electrode 318F and a seventh electrode 318G in place of the second electrode 318B. In addition, as shown in FIG. 10, the insertion portion 319 of the image forming apparatus 10 according to the second embodiment does not include the second resistor R2.

The sixth electrode 318F is conductive. For example, the sixth electrode 318F is a flat-plate-like metal member that is provided in contact with the first electrode 318A. The seventh electrode 318G is conductive. For example, the seventh electrode 318G is, like the sixth electrode 318F, a flat-plate-like metal member and is provided in contact with the fourth electrode 318C. The second resistor R2 is electrically connected with the sixth electrode 318F and the seventh electrode 318G. The seventh electrode 318G is electrically connected with the sixth electrode 318F via the second resistor R2.

As shown in FIG. 9, in the image forming apparatus 10 according to the second embodiment, a detection circuit C3 that is composed of the power supply PS, the first resistor R1, the first electrode 318A, the sixth electrode 318F, the second resistor R2, the seventh electrode 318G, and the fourth electrode 318C is formed. The detection circuit C3 outputs, to the control portion 5, a voltage that is to be applied to the first electrode 318A. It is noted here that in the detection circuit C3, the second resistor R2 is arranged on a conduction path X3 (another example of the first conduction path of the present disclosure) that extends from the sixth electrode 318F that is in contact with the first electrode 318A, to the ground. As a result, the detection circuit C3 outputs a voltage of the power supply PS that has been divided by the first resistor R1 and the second resistor R2, to the control portion 5.

When the toner container 316 is attached to the attachment portion 317, the insertion portion 319 is inserted between the first electrode 318A and the sixth electrode 318F, and between the fourth electrode 318C and the seventh electrode 318G so that the first electrode 318A is separated from the sixth electrode 318F, and the fourth electrode 318C is separated from the seventh electrode 318G.

With this configuration, as shown in FIG. 10, in the image forming apparatus 10 according to the second embodiment, a detection circuit C4 that is composed of the power supply PS, the first resistor R1, the first electrode 318A, the third electrode 319B, the fifth electrode 319C, and the fourth electrode 318C is formed. The detection circuit C4 outputs, to the control portion 5, a voltage that is to be applied to the first electrode 318A. It is noted here that in the detection circuit C4, no resistor is arranged on a conduction path X4 (another example of the second conduction path of the present disclosure) that extends from the third electrode 319B that is in contact with the first electrode 318A, to the ground. As a result, the detection circuit C4 outputs a voltage of 0 volt to the control portion 5. It is noted that a resistor that differs in resistance value from the second resistor R2 may be arranged on the conduction path X4.

Third Embodiment

Figure 11:
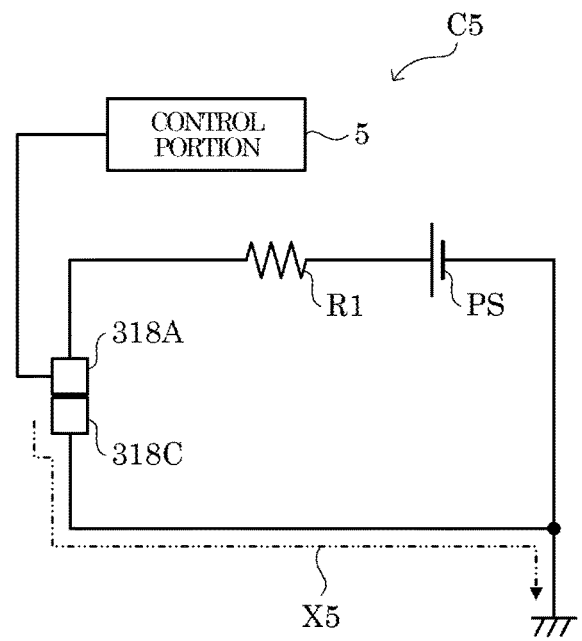
FIG. 11 is a diagram showing a configuration of a detection circuit of an image forming apparatus according to a third embodiment of the present disclosure.
Figure 12:
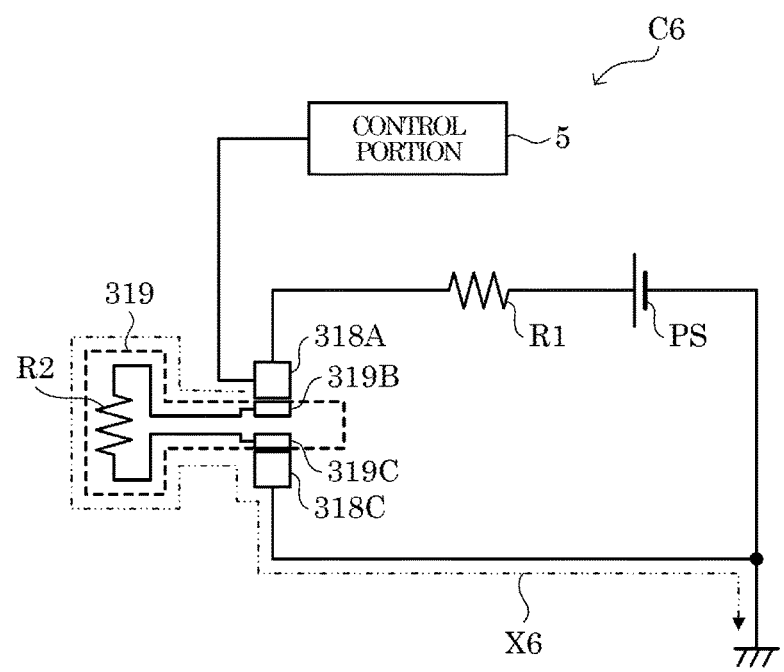
FIG. 12 is a diagram showing a configuration of another detection circuit of the image forming apparatus according to the third embodiment of the present disclosure.

The following describes the image forming apparatus 10 according to the third embodiment of the present disclosure with reference to FIG. 11 and FIG. 12. In the image forming apparatus 10 according to the third embodiment, configurations of the connection portion 318 and the insertion portion 319 are different from those in the first embodiment. The other configurations are common to the first embodiment and the third embodiment. It is noted that FIG. 11 is a circuit diagram showing a detection circuit C5. In addition, FIG. 12 is a circuit diagram showing a detection circuit C6.

Specifically, as shown in FIG. 11, in the image forming apparatus 10 according to the third embodiment, the connection portion 318 does not include the second electrode 318B. In addition, the first electrode 318A and the fourth electrode 318C (another example of the second electrode of the present disclosure) are provided in contact with each other. Furthermore, as shown in FIG. 12, in the insertion portion 319 of the image forming apparatus 10 according to the third embodiment, the third electrode 319B is arranged on a surface of the base body portion 319A that is in contact with the first electrode 318A, and the fifth electrode 319C is arranged on an opposite side of the surface.

As shown in FIG. 11, in the image forming apparatus 10 according to the third embodiment, a detection circuit C5 that is composed of the power supply PS, the first resistor R1, the first electrode 318A, and the fourth electrode 318C is formed. The detection circuit C5 outputs, to the control portion 5, a voltage that is to be applied to the first electrode 318A. It is noted here that in the detection circuit C5, no resistor is arranged on a conduction path X5 (another example of the first conduction path of the present disclosure) that extends from the fourth electrode 318C that is in contact with the first electrode 318A, to the ground. As a result, the detection circuit C5 outputs a voltage of 0 volt to the control portion 5. It is noted that a resistor that differs in resistance value from the second resistor R2 may be arranged on the conduction path X5.

When the toner container 316 is attached to the attachment portion 317, the insertion portion 319 is inserted between the first electrode 318A and the fourth electrode 318C so that the first electrode 318A is separated from the fourth electrode 318C.

With this configuration, as shown in FIG. 12, in the image forming apparatus 10 according to the third embodiment, a detection circuit C6 that is composed of the power supply PS, the first resistor R1, the first electrode 318A, the third electrode 319B, the second resistor R2, the fifth electrode 319C, and the fourth electrode 318C is formed. The detection circuit C6 outputs, to the control portion 5, a voltage that is to be applied to the first electrode 318A. It is noted here that in the detection circuit C6, the second resistor R2 is arranged on a conduction path X6 (another example of the second conduction path of the present disclosure) that extends from the third electrode 319B that is in contact with the first electrode 318A, to the ground. As a result, the detection circuit C6 outputs a voltage of the power supply PS that has been divided by the first resistor R1 and the second resistor R2, to the control portion 5.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An electronic device comprising:
   a first electrode;
   a second electrode configured to be in contact with the first electrode when a detachable member is not attached, and to be separated from the first electrode upon an attachment of the detachable member;

a third electrode configured to come into contact with the first electrode in place of the second electrode upon the attachment of the detachable member;

a first resistor arranged on a conduction path that extends from a power supply to the first electrode;

a second resistor arranged on either a first conduction path or a second conduction path, the first conduction path extending from the second electrode to a ground, the second conduction path extending from the third electrode to the ground; and an attachment/detachment detecting portion configured to detect attachment state of the detachable member based on a voltage applied to the first electrode.

2. The electronic device according to claim 1, wherein the third electrode comes into contact with the first electrode at a contact point between the first electrode and the second electrode.

3. The electronic device according to claim 2, further comprising:

an insertion portion configured to be inserted between the first electrode and the second electrode upon the attachment of the detachable member so that the first electrode and the second electrode are separated from each other, wherein the third electrode is provided on the insertion portion.

4. The electronic device according to claim 3, wherein the second resistor is provided on the insertion portion, the electronic device further comprises:

a fourth electrode provided in contact with a surface of the second electrode that is in contact with the first electrode, and configured to be separated from the second electrode upon the attachment of the detachable member; and a fifth electrode provided on the insertion portion in a state of being connected with the third electrode via the second resistor, and configured to come into contact with the fourth electrode upon the attachment of the detachable member, and the insertion portion is inserted between the first electrode and the second electrode and between the fourth electrode and the second electrode so that the first electrode and the fourth electrode are separated from the second electrode.

5. The electronic device according to claim 4, comprising: the detachable member, wherein
the insertion portion is provided on the detachable member.

6. An image forming apparatus comprising:
the electronic device according to claim 5; and
an image forming portion configured to form an image by using developer, wherein
the detachable member is a developer storage portion configured to store the developer.

7. The image forming apparatus according to claim 6, further comprising:

a determination processing portion configured to, in a case where the attachment/detachment detecting portion has detected an attachment of the developer storage portion, determine, based on the voltage applied to the first electrode, whether or not the developer storage portion is of a predetermined specific type; and a first notification processing portion configured to, in a case where the determination processing portion has determined that the developer storage portion is not of the specific type, notify that.

8. The image forming apparatus according to claim 6, further comprising:

a plurality of attachment portions to which the developer storage portion is attached;

an identification processing portion configured to, in a case where the attachment/detachment detecting portion has detected the attachment of the developer storage portion to one of the attachment portions, identify, based on the voltage applied to the first electrode, a color of developer stored in the developer storage portion; and a second notification processing portion configured to, in a case where the color of developer identified by the identification processing portion is different from a color of developer that has been correlated in advance to the one of the attachment portions to which the developer storage portion has been attached, notify that.

* * * * *